United States Patent
Judy et al.

(10) Patent No.: US 8,794,068 B2
(45) Date of Patent: Aug. 5, 2014

(54) NON-DEGENERATE MODE MEMS GYROSCOPE

(75) Inventors: Michael W. Judy, Ipswich, MA (US); John A. Geen, Tewksbury, MA (US); Houri Johari-Galle, Sunnyvale, CA (US)

(73) Assignee: Analog Devices, Inc., Norwood, MA (US)

( * ) Notice: Subject to any disclaimer, the term of this patent is extended or adjusted under 35 U.S.C. 154(b) by 252 days.

(21) Appl. No.: 13/309,511

(22) Filed: Dec. 1, 2011

(65) Prior Publication Data

US 2012/0137774 A1 Jun. 7, 2012

Related U.S. Application Data

(60) Provisional application No. 61/418,675, filed on Dec. 1, 2010.

(51) Int. Cl.
*G01C 19/56* (2012.01)

(52) U.S. Cl.
USPC ...................................... 73/504.12

(58) Field of Classification Search
USPC .............. 73/504.01, 504.12, 504.13
See application file for complete search history.

(56) References Cited

U.S. PATENT DOCUMENTS

| | | | |
|---|---|---|---|
| 4,655,081 A | 4/1987 | Burdess ......................... | 73/505 |
| 5,383,362 A | 1/1995 | Putty et al. ..................... | 73/505 |
| 7,543,496 B2 | 6/2009 | Ayazi et al. ................. | 73/504.12 |
| 2007/0220971 A1 | 9/2007 | Ayazi et al. ................. | 73/504.02 |
| 2007/0256495 A1 | 11/2007 | Watson ...................... | 73/504.12 |
| 2009/0266162 A1 | 10/2009 | Ayazi et al. ................. | 73/504.12 |
| 2010/0294039 A1 | 11/2010 | Geen .......................... | 73/504.12 |
| 2011/0254599 A1 | 10/2011 | Dikshit et al. ................ | 327/156 |

FOREIGN PATENT DOCUMENTS

| | | | | |
|---|---|---|---|---|
| EP | 2 078 925 A2 | 7/2009 | ............ | G01C 19/56 |
| JP | 2004 301734 | 10/2004 | ............ | G01C 19/56 |

OTHER PUBLICATIONS

Benes, et al., "Comparison Between BAW and SAW Sensor Principles," *IEEE Transactions on Ultrasonics, Ferroelectrics and Frequency Control*, vol. 45 No. 5, Sep. 1998, pp. 1314-1330, 17 pages.
Drafts, "Acoustic Wave Technology Sensors," *Sensors*, http://www.sensorsmag.com/sensors/acoustic-ultrasound/acoustic-wave-technology-sensors-936, Oct. 1, 2000, 5 pages.
Bernstein, "An Overview of MEMS Inertial Sensing Technology," *Sensors*, http://www.sensorsmag.com/sensors/acceleration-vibration/an-overview-mems-inertial-sensing-technology-970, Feb. 1, 2003, 6 pages.

(Continued)

*Primary Examiner* — John Chapman, Jr.
(74) *Attorney, Agent, or Firm* — Sunstein Kann Murphy & Timbers LLP

(57) ABSTRACT

Bulk acoustic wave (BAW) gyroscopes purposefully operate using non-degenerate modes, i.e., resonant frequencies of drive and sense modes are controlled so they are not identical. The resonant frequencies differ by a small controlled amount ($\Delta f$). The difference ($\Delta f$) is selected such that the loss of sensitivity, as a result of using non-degenerate modes, is modest. Non-degenerate operation can yield better bandwidth and improves signal-to-noise ratio (SNR) over comparable degenerate mode operation. Increasing Q of a BAW resonator facilitates trading bandwidth for increased SNR, thereby providing a combination of bandwidth and SNR that is better than that achievable from degenerate mode devices. In addition, a split electrode configuration facilitates minimizing quadrature errors in BAW resonators.

24 Claims, 11 Drawing Sheets

(56) References Cited

OTHER PUBLICATIONS

Satrom, et al., "Disc Resonating Gyroscopes: A Summary of a Recent Development in MEMS Technology," Northwestern University, http://www.google.com/url?sa=t&rct=j&q=&esrc=s&frm=1 &source=web&cd=1&sqi=ved=0CCQQFjAA &url=http%3A%2F%2Fclifton.mech.northwestern. edu%2F~me381%2Fproject%2F06fall%2FFruthSatrom.pdf &ei=ZOsyT6D3lMjMrQfE6qSnDA &usg=AFQjCNFXOj00sAsF6bMdfEV70D7JzzLkBw &sig2=jwpUlTgot45sT_fgi81zMw , Dec. 1, 2006, 15 pages.

Johari, et al., "Capacitative Bulk Acoustic Wave Silicon Disk Gyroscope", Electron Devices Meeting, Dec. 11-13, 2006, IEDM '06 International, pp. 1-4, [Paper Abstract] http://ieeexplore.ieee.org/Xplore/login jsp?url=http%3A%2F%2Fieeexplore.ieee. org%2Fiel5%2F4154162%2F4139311%2F04154246.pdf/%3Farnumber%3D4154246&authDecision=-203 , 2010, 1 page.

Johari, et al., "High-Frequency Capacitive Disk Gyroscope in (100) and (111) Silicon," School of Electrical and Computer Engineering, Georgia Institute of Technology, MEMS 2007, pp. 47-50, Jan. 2007, 4 pages.

Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, Dec. 2008, 201 pages.

Johnson, "Qualtre Preps Solid State MEMS Gyros," *Mems Investor Journal*, http://www.memsinvestorjournal.com/2010/04/qualtre-preps-solidstate-mems-gyros.html , Apr. 8, 2010, 2 pages.

Celikel, et al., "Optoelectric Design Parameters of Interferometric Fiber Optic Gyroscope with LiNbO3 Having North Finder Capability and Earth Rotation Rate Measurement, "*Indian Journal of Pure & Applied Physics*, vol. 48, pp. 375-384, Jun. 2010, 10 pages.

Doe, "Qualtré Targets 3-Axis Gyro Market with Alternative Technology," *MEMS Trends*, Issue No. 3, pp. 8, Jul. 2010, 1 page.

Ramirez, "PZE Energy Harvester," *45 RF MEMS Based Circuit Design*—conocimeintos.com.ve, http://conocimientosrfmemsdesign.blogspot.com/2010/07/pze-energy-harvester.html , Jul. 24, 2010, 4 pages.

Ayazi, "Intergrated Solutions for Motion Sensing in Handheld Devices,"Qualtré Inc., http://www.qualtre.com/motion-sensing-technology/, Oct. 2010, 3 pages.

International Searching Authority, Invitation to Pay Additional Fees and, Where Applicable, Protest Fee; European Patent Office, International Application No. PCT/US2011/062966, 6 pages, dated Feb. 3, 2012.

Johari, et al., "Capacitive Bulk Wave Silicon Disk Gyroscopes," Electron Devices Meeting, 2006, Dec. 1, 2006, 4 pages.

International Searching Authority, International Search Report and Written Opinion, International Application No. PCT/US2011/062966, mailed Apr. 12, 2012, 15 pages.

International Searching Authority, Invitation to Pay Additional Fees and, Where Applicable, Protest Fee, International Application No. PCT/US2011/062961, May 8, 2012, 8 pages.

Mode A

Mode B

(Higher mode BAW gyroscopes differ in electrode configuration)

Exemplary Frequency Differences

| Phase offset (half cycles) | Phase offset (degrees) | Freq. offset (units of resonance/Q) | Resonance gain of sensor mode (units of Q) | 3dB bandwidth (normalized to degenerate case) | Fixed B/W SNR improvement |
|---|---|---|---|---|---|
| 0 | 0 | 0 | 1 | 1 | 1 |
| 1/4 | 45 | 0.5 | 0.71 | 1.8 | 2.3 |
| 1/4 + 1/16 | 56.3 | 0.75 | 0.55 | 2.5 | 3.4 |
| 1/4 + 1/8 | 67.5 | 1.2 | 0.38 | 3.8 | 5.5 |
| 1/4 + 1/8 + 1/32 | 73.1 | 1.7 | 0.28 | 5.4 | 8.1 |

*FIG. 14*

NON-DEGENERATE MODE MEMS GYROSCOPE

CROSS REFERENCE TO RELATED APPLICATIONS

This application claims the benefit of U.S. Provisional Patent Application No. 61/418,675, filed Dec. 1, 2010, titled "Non-Degenerate Shell-Type Gyroscope," the entire contents of which are hereby incorporated by reference herein, for all purposes.

TECHNICAL FIELD

The present invention relates to microelectromechanical systems (MEMS) gyroscopes and, more particularly, to bulk acoustic wave (BAW) MEMS gyroscopes that operate in non-degenerate modes.

BACKGROUND ART

One type of conventional microelectromechanical systems (MEMS) gyroscope includes a proof mass suspended by springs within a support structure. A drive circuit causes the proof mass to oscillate (translate back and forth) in a plane of oscillation. Hence, this type of device is often referred to as a "shuttle-type gyroscope." When the support structure is rotated in the plane of oscillation, the proof mass tends to continue oscillating in the plane but, as a result of the Coriolis Effect, the proof mass is displace in a direction perpendicular to both the axis of oscillation and the axis of rotation. This displacement causes a change in capacitance between the proof mass and a stationary electrode. The magnitude of the change in capacitance is proportional to the angular rate of the rotation. Shuttle-type gyroscopes operate at relatively low frequencies (apx. 3-30 kHz), and they have relatively large form factors and require relatively high operating voltages and low pressure packaging environments.

Capacitive "bulk acoustic wave" (BAW) silicon disk gyroscopes were developed to alleviate some of the disadvantages of shuttle-type gyroscopes. In a BAW gyroscope, a bulk mass, typically supported by a pedestal, is made to oscillate in a "bulk acoustic mode." Instead of the entire bulk mass translating back and forth as in the shuttle-type gyroscope, the crystal lattice of the bulk mass oscillates. As a result, the shape of the bulk mass oscillates, typically at a frequency of several megahertz. For example, a bulk mass disk may oscillate between two oblong shapes, one oriented such that its major axis is perpendicular to the major axis of the other oblong shape.

When a BAW gyroscope is rotated, the bulk mass responds by oscillating between two other shapes or two other axis orientations. The amplitude of this second oscillating mode is proportional to the angular rate of rotation. Stationary electrodes capacitively detect the amplitude of the second oscillation. A drive circuit drives the BAW gyroscope to oscillate between the first two shapes (referred to as a "drive mode" of oscillation), and the second oscillation (resulting from the rotation) is referred to as a "sense mode" of oscillation.

BAW gyroscope use has increased in recent years, at least in part because a typical BAW gyroscope can provide a higher gain (i.e., an increased output signal level for a given rate of angular rotation) and require less power than shuttle-type gyroscopes. However, very slight manufacturing or material imperfections ("non-idealities") in BAW gyroscopes pose serious problems. For example, such non-idealities cause the resonant frequency of the drive mode of oscillation to be different than the resonant frequency of the sense mode of oscillation, leading to a loss of sensitivity (i.e., lower amplitude of oscillation in the sense mode for a given angular rate of rotation) and, more seriously, in phase errors, which cause an output from the gyroscope in the absence of rotation.

The prior art compensates for non-idealities by applying DC bias voltages to "tuning" electrodes located near the bulk mass, based on measured non-idealities of a given device. These compensations are applied in an attempt to cause the drive and sense modes to have identical resonant frequencies, i.e., for the drive and sense modes to be degenerate. However, maintaining degeneracy is difficult in the case of high quality (Q) oscillators, due to the need for tight control of these parameters over time and despite variations in temperature of the bulk mass.

SUMMARY OF EMBODIMENTS

An embodiment of the present invention provides a microelectromechanical systems (MEMS) gyroscope. The gyroscope includes a substrate and a primary member attached to the substrate. The primary member is configured to vibrate in a first bulk acoustic mode at a drive frequency in response to a varying electrostatic signal. The primary member is also configured to vibrate in a second bulk acoustic mode at the drive frequency in response to the primary member being rotated about an axis. The second bulk acoustic mode is different than the first bulk acoustic mode. The first bulk acoustic mode and the second bulk acoustic mode are non-degenerate.

The second bulk acoustic mode may be characterized by a resonant frequency. The drive frequency may differ from the resonant frequency of the second bulk acoustic mode. The microelectromechanical systems (MEMS) gyroscope may also include a drive circuit and a servo circuit coupled to the drive circuit. The drive circuit may be configured to generate the varying electrostatic signal. The servo circuit may be configured to sense phase response of the second bulk acoustic mode and to automatically adjust operation of the drive circuit, so as to maintain the difference between the resonant frequency and the drive frequency.

The second bulk acoustic mode may be characterized by a resonant frequency. The drive frequency may differ from the resonant frequency of the second bulk acoustic mode by $\Delta f$, where $\Delta f$ is between about $f_0/24Q$ and about $6f_0/Q$, and where $f_0$ is the drive frequency.

In some cases, $\Delta f$ is between about $f_0/12Q$ and about $3f_0/Q$, where $f_0$ is the drive frequency.

In some cases, $\Delta f$ is about $f_0/2Q$, and $f_0$ is the drive frequency.

The second bulk acoustic mode may be characterized by a resonant frequency. The drive frequency may differ from the resonant frequency of the second bulk acoustic mode by $\Delta f$, where $\Delta f$ is greater than 0 Hz and up to about 10 KHz.

In some cases, $\Delta f$ corresponds to a second bulk acoustic mode displacement phase angle of between about −5° and about −85°.

In some cases, $\Delta f$ corresponds to a second bulk acoustic mode displacement phase angle of between about −20° and about −60°

In some cases, $\Delta f$ corresponds to a second bulk acoustic mode displacement phase angle of about −45°.

The microelectromechanical systems (MEMS) gyroscope may also include a drive circuit and at least one split electrode. The drive circuit may be configured to generate the varying electrostatic signal. The at least one split drive electrode may have a surface counterfacing a side of the primary member. The at least one split drive electrode may be coupled to the drive circuit to receive the varying electrostatic signal. Each of the at least one split electrode may include a first sub-electrode and a second-sub-electrode. The counterfacing surface may be approximately equally divided between the first and second sub-electrodes. The first sub-electrode may be spaced apart from the second sub-electrode by distance less than about 0.1 times a width of the surface of the split electrode.

Another embodiment of the present invention provides a microelectromechanical systems (MEMS) gyroscope that includes a bulk acoustic resonator, at least one first electrode and at least one second electrode. The at least one first electrode is coupled to the bulk acoustic resonator. The at least one first electrode is positioned to excite vibration of the bulk acoustic resonator in a first bulk acoustic wave mode. The at least one second electrode is coupled to the bulk acoustic resonator. The at least one second electrode is positioned to detect vibration of the bulk acoustic resonator in a second bulk acoustic mode. The first and second bulk acoustic wave modes are non-degenerate.

Yet another embodiment of the present invention provides a method for sensing angular rotation. The method includes applying a varying electrostatic signal to a primary member to cause the primary member to vibrate in a first bulk acoustic mode at a drive frequency. The method also includes rotating the primary member. The method further includes sensing a second bulk acoustic mode vibration of the primary member at the drive frequency. The first bulk acoustic mode is different than the second bulk acoustic mode. The first bulk acoustic mode and the second bulk acoustic mode are non-degenerate.

An embodiment of the present invention provides a microelectromechanical systems (MEMS) gyroscope. The MEMS gyroscope includes a bulk acoustic resonator and a split electrode. The bulk acoustic resonator is configured to vibrate in a first bulk acoustic mode in response to a varying electrostatic signal. The split electrode is disposed proximate a desired location of an anti-node of the first bulk acoustic mode. The split electrode includes at least two electrodes disposed symmetrically about the desired location of the anti-node.

The at least two electrodes may be separated from each other by no more than about 0.1 times a width of one of the two electrodes.

The microelectromechanical systems (MEMS) gyroscope may include a first gain-adjustable amplifier, a second gain-adjustable amplifier and a summer coupled to outputs of the first and second gain-adjustable amplifiers. an input of the first gain-adjustable amplifier is coupled to one of the two electrodes. An input of the second gain-adjustable amplifier is couple to the other of the two electrodes.

The microelectromechanical systems (MEMS) gyroscope may include a servo circuit configured to automatically adjust gains of the first and second gain-adjustable amplifiers, so as to reduce a quadrature error.

The servo circuit may be configured to automatically adjust the gains of the first and second gain-adjustable amplifiers, based on at least one phase-shifted reference signal.

The microelectromechanical systems (MEMS) gyroscope may include a servo circuit configured to automatically adjust gains of the first and second gain-adjustable amplifiers, so as to maximize output of the summer, in response to application of a signal to the bulk acoustic resonator.

The servo circuit may be configured to automatically adjust the gains of the first and second gain-adjustable amplifiers, based on at least one phase-shifted reference signal.

The microelectromechanical systems (MEMS) gyroscope may include a drive circuit coupled to the at least two electrodes. The drive circuit may be configured to differentially drive the at least two electrodes.

The microelectromechanical systems (MEMS) gyroscope may include a servo circuit coupled to the drive circuit. The servo circuit may be configured to automatically adjust how the drive circuit differentially drives the at least two electrodes, so as to reduce a quadrature error.

The servo circuit may be configured to automatically adjust how the drive circuit differentially drives the at least two electrodes, based on at least one phase-shifted reference signal.

BRIEF DESCRIPTION OF THE DRAWINGS

The invention will be more fully understood by referring to the following Detailed Description of Specific Embodiments in conjunction with the Drawings, of which:

FIG. 14 contains a table that lists examples of various frequency differences between drive and sense modes and corresponding results, compared to operating in degenerative mode, according to an embodiment of the present invention.

DETAILED DESCRIPTION OF SPECIFIC EMBODIMENTS

In accordance with preferred embodiments of the present invention, methods and apparatus are disclosed for bulk acoustic wave (BAW) gyroscopes that purposefully operate using non-degenerate modes. The prior art teaches away from operating in non-degenerate modes, because such operation yields reduced signal strength and, therefore, reduced sensitivity to the Coriolis (rotation) signal. However, the inventors have discovered that non-degenerate operation can yield better bandwidth and improves signal-to-noise ratio (SNR) over comparable degenerate mode operation. Resonant frequencies of drive and sense modes are controlled so they are not identical (i.e., the drive and sense modes are non-degenerate). Instead, these resonant frequencies differ by a small controlled amount ($\Delta f$). In some embodiments, electrostatic forces are used to selectively alter the stiffness of the drive and/or sense mode(s), thereby altering the drive and/or sense resonant frequency(ies). The difference ($\Delta f$) between the drive and sense resonant frequencies is selected such that the loss of sensitivity, as a result of using non-degenerate modes, is modest. Thus, an advantageous compromise may be achieved between reduced sensitivity and increased bandwidth. Furthermore, with non-degenerate operation, increasing Q of the BAW resonator enables a designer to trade some or all of the increased available bandwidth for increased SNR, thereby providing a combination of bandwidth and SNR that is better than that achievable from degenerate mode devices. In addition, a split electrode configuration facilitates minimizing quadrature errors in BAW resonators.

Oscillation Mode Number

Figure 1:
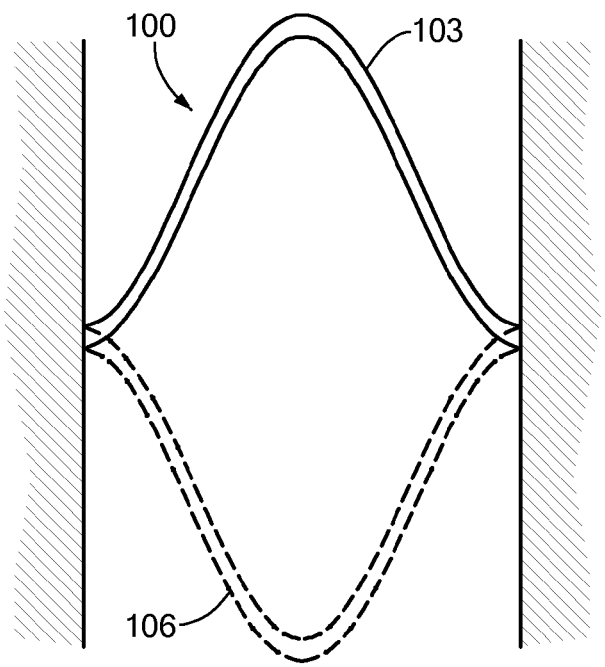
FIGS. 1 and 2 are schematic diagrams of a vibrating beam, according to the prior art.
Figure 2:
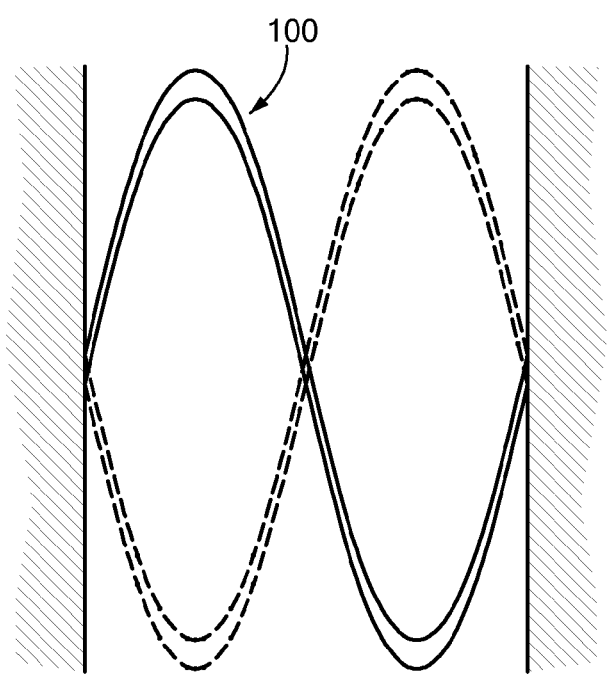

A mode of vibration of a body or a system is characterized by a modal frequency and a mode shape. The mode is numbered according to the number of half-waves in the vibration. For example, FIG. 1 schematically illustrates a vibrating beam 100 that is pinned at both ends. The beam 100 vibrates between solid line 103 and dashed line 106 positions. In the oscillating mode shown in FIG. 1, the beam 100 exhibits one half-sine wave, so the mode number is 1. FIG. 2 schematically illustrates the beam 100 of FIG. 1, except in FIG. 2 the beam 100 is vibrating so as to exhibit two half-sine waves. Thus, in the case of the vibrations shown in FIG. 2, the mode number is 2.

In a bulk acoustic wave (BAW) oscillator (resonator), a bulk mass vibrates, such as between two shapes. BAW oscillators can oscillate in any of one or more modes, depending on their composition, shape, support structure, drive signal, etc.

Figure 3:
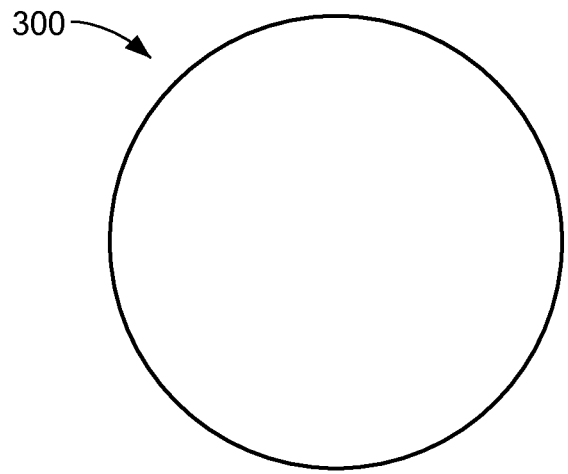
FIGS. 3 and 4 are top schematic views of a hypothetical bulk mass disk that is round at rest, but that oscillates in one mode between two oblong shapes, according to the prior art.
Figure 4:
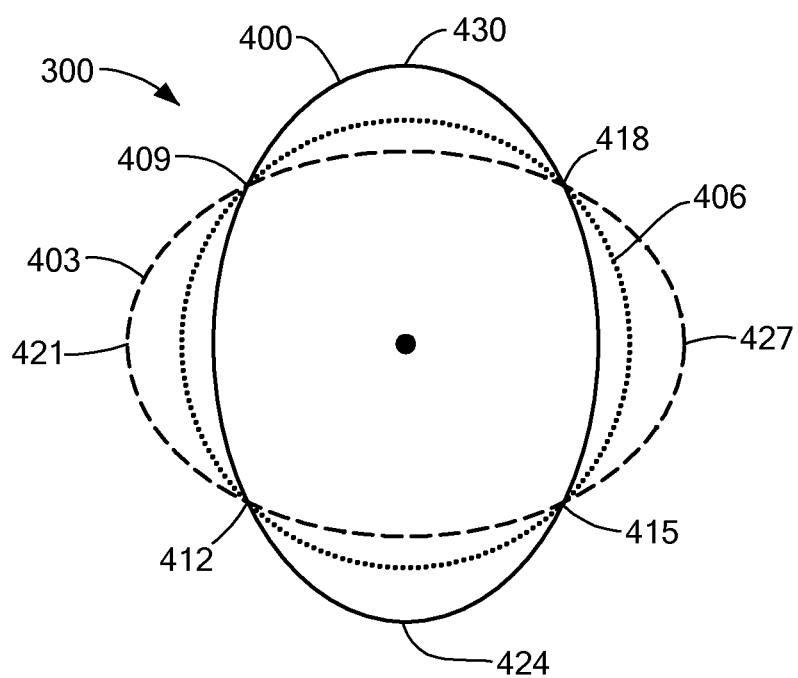

FIG. 3 is a top schematic view of a hypothetical bulk mass disk 300 that is round at rest, but that oscillates in one mode between two oblong shapes 400 and 403 shown in FIG. 4. Although not visible in FIG. 3, the bulk mass disk 300 may be supported, such as by a central pedestal. For clarity, shape 400 is shown in solid line, whereas shape 403 is shown in dashed line. For reference, the rest (round) shape of the disk 300 is shown in dotted line 406. Portions of an oscillating mass that do not move, such as points 409, 412, 415 and 418, are referred to as "nodes." Portions of an oscillating mass that translate maximally, such as points 421, 424, 427 and 430, are referred to as "anti-nodes."

Figure 5:
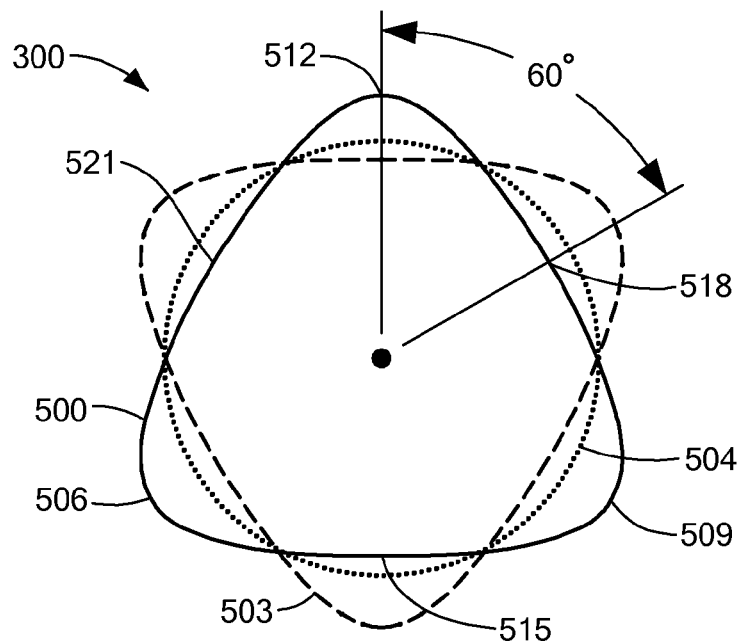
FIG. 5 is a schematic diagram that illustrates another mode of oscillation of the bulk mass disk of FIG. 3, according to the prior art.

FIG. 5 schematically illustrates another mode of oscillation of the BAW disk 300. In the oscillation mode shown in FIG. 5, the disk 300 oscillates between two regular trilobate shapes shown, respectively, in solid line 500 and dashed line 503. For reference, the rest (round) shape of the disk 300 is shown in dotted line 504. In the hypothetical BAW oscillation mode shown in FIG. 5, the two shapes 500 and 503, between which the disk 300 oscillates, are oriented 60° apart.

Bulk Acoustic Wave (BAW) Disk Oscillator (Resonator)

Figure 6:
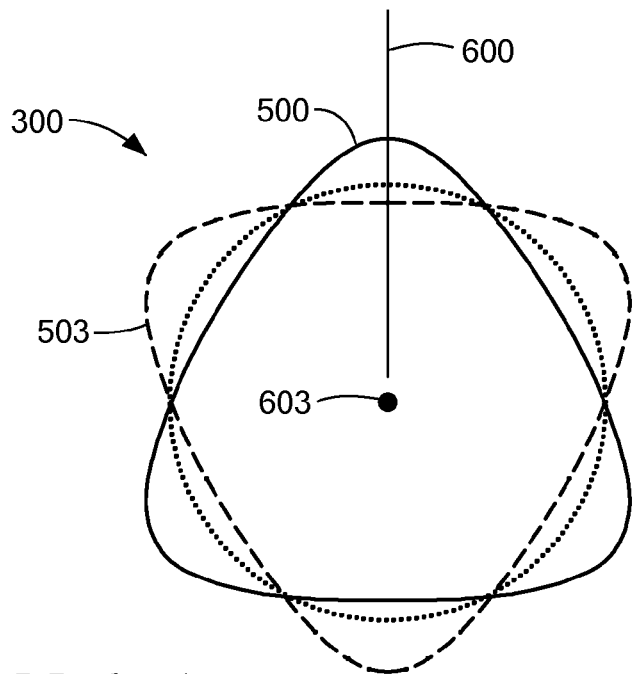
FIGS. 6 and 7 are top schematic views of the hypothetical bulk mass disk of FIG. 3 showing another mode of oscillation.
Figure 7:
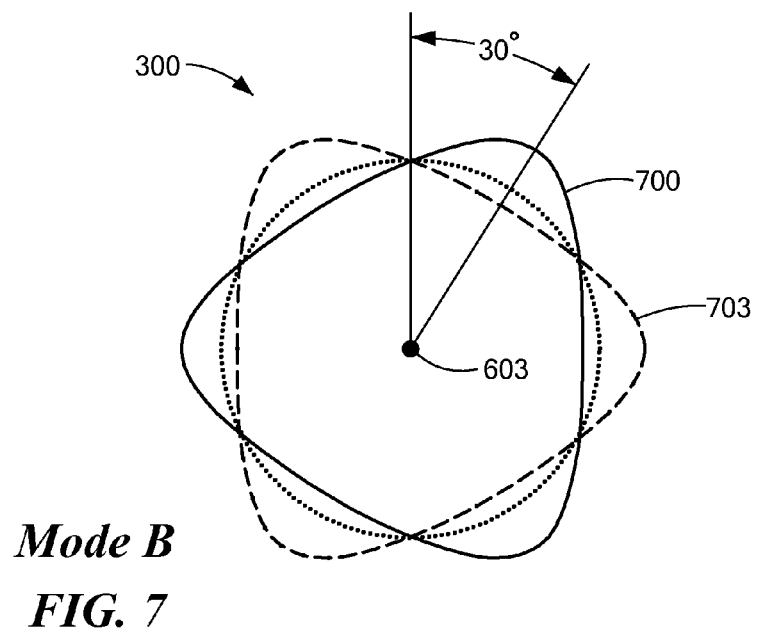

FIG. 6 schematically illustrates one oscillation mode (herein called "mode A," for simplicity of reference) of the BAW disk 300 described above. Axis 600 represents a direction along which one of the six anti-nodes translates. FIG. 7 schematically illustrates another oscillation mode ("mode B") of the same BAW disk 300. Although the shapes 500 and 503 the BAW disk takes on while oscillating in mode A are similar to the shapes 700 and 703 of mode B (apart from the 30° rotation about the center 603 of the mode B shapes 700 and 703, relative to the mode A shapes 500 and 503), these two modes are distinct from each other. Thus, in the hypothetical disk 300, the modes A and B are spatially 30° apart. However, in other disks, the spatial separation between modes may be different. For example, the BAW disk 300 may be a (100) single-crystal silicon ("SCS") disk. Ideally fabricated (100) SCS has energetically discrete, six-anti-node modes that are spatially 30° apart and that have identical resonant frequencies. On the other hand, ideally fabricated (111) SCS or polysilicon has energetically discrete, four-anti-node modes that are spatially 45° apart and that have identical resonant frequencies.

Figure 8:
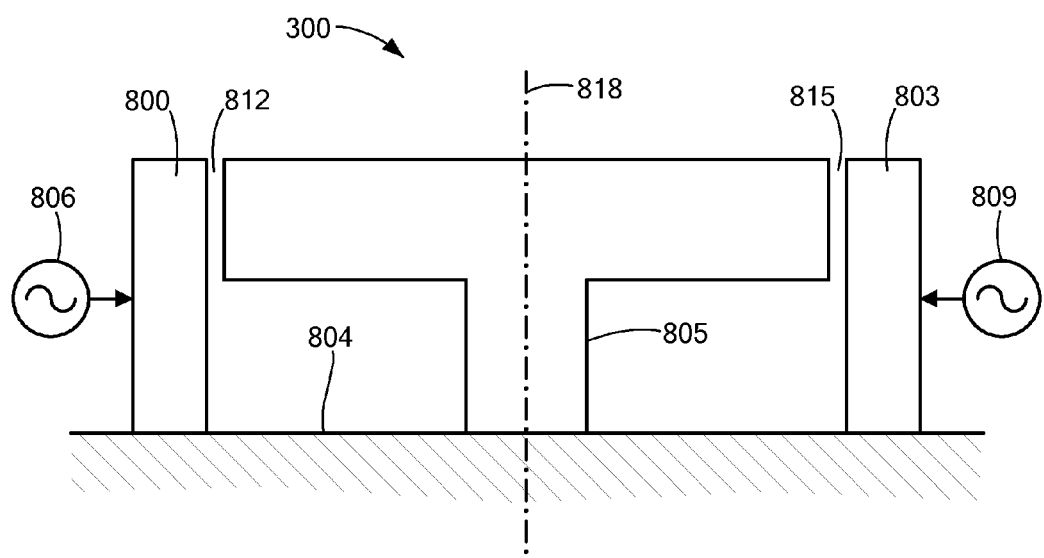
FIG. 8 is a schematic side view of a bulk acoustic wave (BAW) disk, according to an embodiment of the present invention.

FIG. 8 is a schematic side view of the BAW disk 300 with drive electrodes 800 and 803 on two sides thereof. Other numbers of drive electrodes may be used, as discussed below. The BAW disk 300 is supported above a substrate 804 by a central pedestal 805. Optionally or alternatively, the BAW disk 300 may be suspended by a central pedant (not shown) from an upper substrate (not shown) that is above the BAW disk 300. Optionally or alternatively, the BAW disk 300 may be supported by both a pendant from a lower substrate and by a pendant from an upper substrate (not shown). Support structures, such as pedestals and pendants, are collectively herein referred to as "pedestals." Similarly, the electrodes may be supported from below, from above or both. More information about support pedestals and pendants is provided in U.S. Provisional Patent Application No. 61/418,668 entitled "Shell-Type Gyroscope with Reduced Linear Acceleration Sensitivity," filed on Dec. 1, 2010, U.S. patent application Ser. No. 12/940,354, entitled, "Resonating Sensor with Mechanical Constraints," filed Nov. 5, 2010 and U.S. patent application Ser. No. 13/308,687, entitled, "Apparatus and Method for Anchoring Electrodes in MEMS Devices," filed Dec. 1, 2011, the entire contents of each of which are hereby incorporated herein for all purposes. A DC bias is applied to the disk 300. Alternating electrical drive signals 806 and 809 applied to the electrodes 800 and 803 create alternating electrostatic forces in gaps 812 and 815 that alternatingly pull on the sides of BAW disk 300 to stimulate the disk 300 to oscillate.

Figure 9:
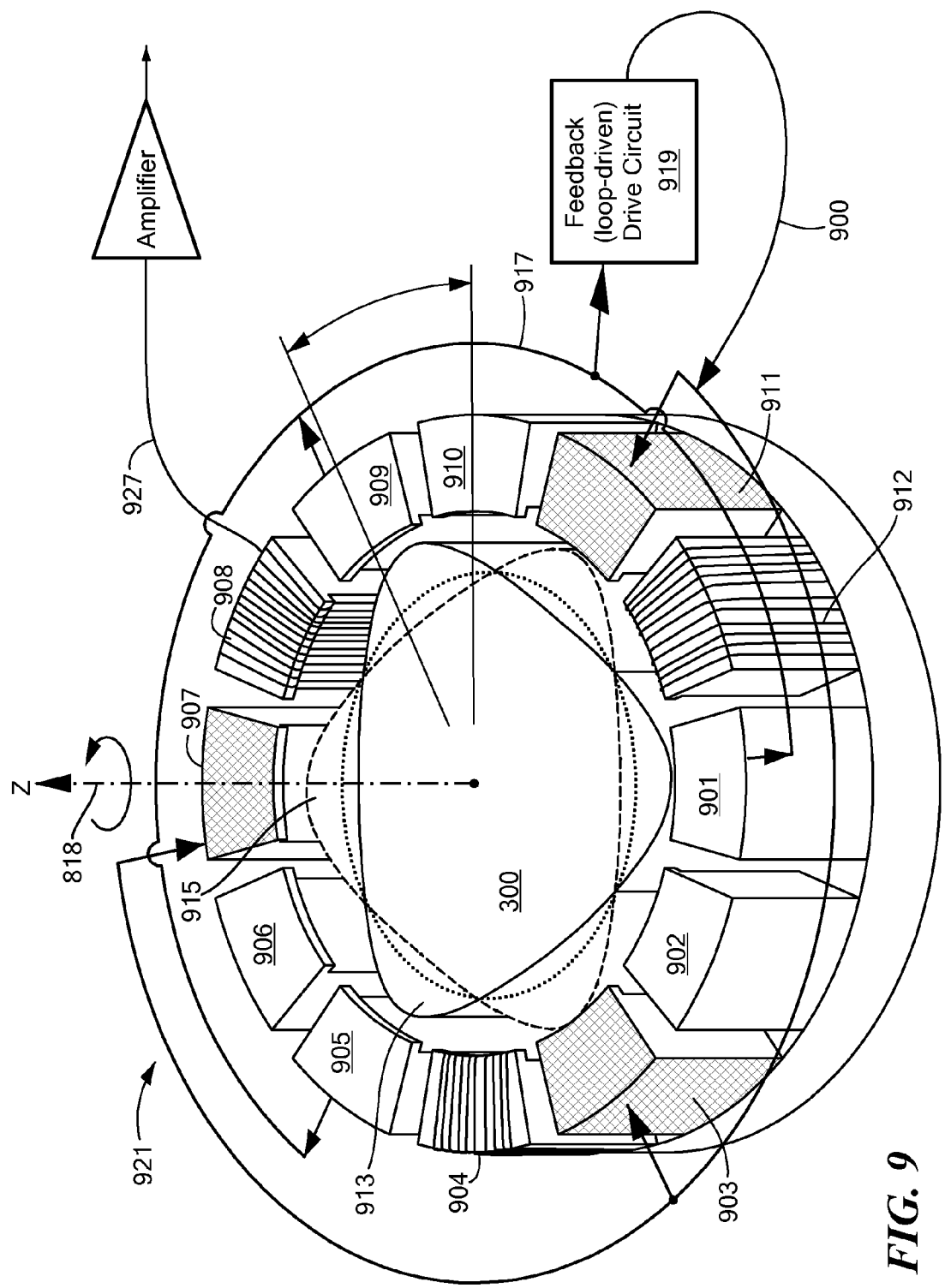
FIG. 9 is a perspective schematic diagram of a BAW disk, schematically showing an arrangement of electrodes and a drive circuit, according to an embodiment of the present invention.

FIG. 9 is a perspective schematic diagram of a rate gyroscope 921 that includes the BAW disk 300. FIG. 9 shows one possible electrode and driving arrangement. Assuming the BAW disk 300 has the oscillation modes A and B shown in FIGS. 6 and 7, the BAW disk 300 can be driven by a sinusoidal, square wave or other suitable drive signal 900 applied to, for example, drive electrodes 903, 907 and 911. The locations of the drive electrodes 903-911 determine locations of anti-nodes in the driven oscillating BAW disk 300. In mode A (hereinafter also referred to as the "drive mode"), the BAW disk 300 oscillates between the two shapes shown in solid line 913 and dashed line 915.

Drive pickoff electrodes 901, 905 and 909 are located proximate anti-nodes of the mode A oscillations. The BAW disk 300 and the drive pickoff electrodes 901-909 form capacitors whose values vary as the BAW disk 300 oscillates, thereby generating a signal 917. Thus, the signal 917 indicates the real-time amplitude and phase (relative to the drive signal 900) of the oscillation in mode A. The signal 917 may be used by a feedback circuit 919 to control generation of the drive signal 900, as discussed below.

Coriolis Effect

Absent other influences, the disk 300 exhibits little or no oscillation in mode B. However, rotating the BAW disk 300 about z axis 818 (also shown in FIG. 8) causes the amplitude of oscillation in mode A to decrease and the amplitude of the oscillations in mode B to increase, due to the Coriolis Effect. The change in amplitude is proportional to the rate of rotation (angular rate) about the z-axis 924. Essentially, the rotation shifts energy from the drive mode (A) oscillations to the mode B oscillation, thereby exciting mode B oscillation. The amplitude and phase of the B mode oscillation can be detected by one or more sense electrodes. For example, electrode 908, located proximate an anti-node of the mode B oscillation, generates a sense signal 927 that is amplified to provide a Coriolis signal indicating rotation of the BAW disk 300 about its axis 818. Hereinafter, mode B is also referred to as the "sense mode."

Non-Degenerate Mode

When stimulated by the drive signal 900 and rotated about the axis 818, the BAW disk 300 might simultaneously exhibit more than one mode of oscillation. In general, the exhibited modes may all have the same general shapes and resonant frequency, or some or all of the modes may have their own respective shapes or resonant frequencies. The resonant frequency(ies), shapes and angles between which the bulk mass oscillates, the angular relationships between or among the modes, as well as other characteristics of the BAW oscillations depend on composition of the bulk mass, its shape, support structure, drive signal, etc. The actual time-varying shape of the bulk mass disk 300 is a linear combination of the simultaneously oscillating modes. In other words, the actual real-time shape of the bulk mass results from a superpositioning of the oscillating modes. The bulk mass disk 300 may also exhibit oscillation modes other than modes A and B, but they are not discussed here to simplify the description. Modes that have identical resonant frequencies are referred to as being "degenerate modes," because oscillations in these modes cannot be distinguished from each other according to frequency. On the other hand, a set of modes that have non-identical resonant frequencies are referred to as being "non-degenerate."

The resonant frequencies of the BAW disk 300 modes (A and B) are largely influenced by mechanical stiffness of the material from which the BAW disk 300 is fabricated and, to an extent, stiffness of its pedestal 805. If the BAW disk 300 were ideally fabricated, mode A would have the same resonant frequency as mode B, thus modes A and B would be degenerate. However, real world "non-idealities," primarily geometric asymmetries and material imperfections in the bulk material, cause mode A to have a slightly different resonant frequency than mode B. For example, anisotropic stiffness within the bulk material can cause a difference in the resonant frequencies of the two modes.

As noted, we have found that operating a BAW gyroscope with non-degenerate drive and sense modes provides advantages. In some embodiments, inevitable non-idealities cause the drive and sense modes to be non-degenerate. According to some embodiments of the present invention, imperfections may be purposefully introduced during manufacture to cause the drive mode (A) and sense mode (B) to resonate at different frequencies. Optionally or alternatively, drive, sense or other electrodes may be positioned, relative to the BAW disk 300, and driven with signals so as to cause the two modes to resonate at different frequencies.

Figure 10:
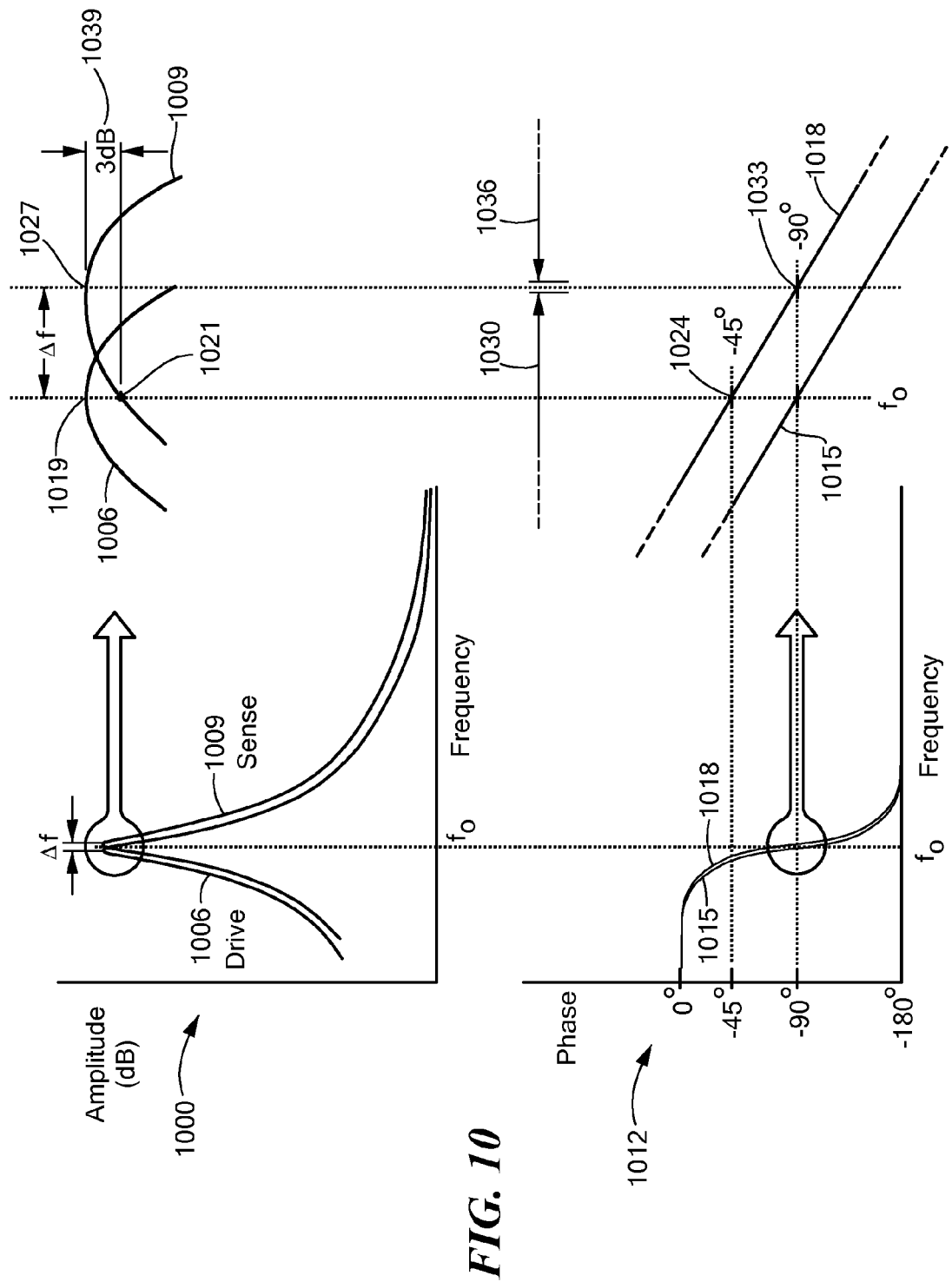
FIG. 10 shows hypothetical plots of the two non-degenerate modes of the system of FIG. 9.

Assuming the BAW disk 300 is driven in its drive mode (A) at its resonant frequency $f_0$ and the sense mode (B) is stimulated, such as due to an angular rate about the axis 818, the BAW disk 300 oscillates in the sense mode at the drive frequency. Note that the sense mode may oscillate at less than its maximum amplitude, because the sense mode is oscillating away from its resonant frequency. The sense mode oscillations cause the sense mode signal 927 to be generated. FIG. 10 shows hypothetical plots of these non-degenerate drive and sense modes. The resonant frequency of the drive mode (A) is $f_0$. The difference between the resonant frequencies of the drive and sense modes is $\Delta f$. A displacement amplitude graph 1000 shows a response curve 1006 for the drive mode and a response curve 1009 for the sense mode. Similarly, a phase graph 1012 shows phase curves 1015 and 1018 for the drive and sense modes, respectively. The phase is shown relative to the drive signal 900.

A portion of each graph 1000 and 1012 is enlarged for clarity. The amplitude plot 1000 of a real BAW disk may show more than one peak, i.e., a real BAW disk may have other resonant frequencies, depending on the material, etc. However, for simplicity of this explanation, only one resonant frequency is shown for each mode. Furthermore, the plots in FIG. 10 are somewhat distorted and/or exaggerated to make them easier to understand. In reality, for example, the peaks of the amplitude plots 1006 and 1009 are likely to be much sharper than shown.

The phase plot 1015 shows the phase of the oscillatory displacements of the BAW disk 300 in the drive mode, relative to the drive signal 900, at various drive frequencies. For example, if the BAW disk 300 is driven at its resonant frequency $f_0$, the drive mode oscillatory displacements are $-90°$ out of phase with the drive signal 900, i.e., the displacement oscillation lags the drive signal by 90°.

Similarly, phase plot 1018 shows the phase (relative to the drive signal 900) of the oscillatory displacements of the BAW disk 300 in the sense mode, at various drive frequencies. For example, if the drive mode of the BAW disk 300 is driven at its resonant frequency $f_0$ 1019, the BAW disk 300 oscillates in the sense mode at $f_0$, as indicated at 1021, and oscillatory displacements of the sense mode are $-45°$ 1024 (in this hypothetical example), out of phase with the drive signal 900, because the Coriolis excitation of the sense mode is in phase with the velocity of the drive mode, which in turn is in phase with the drive signal 900, when the drive mode is operated at resonance. That is, the sense mode displacement oscillation lags the drive signal by 45°. Driving the drive mode at a frequency less than the sense mode resonant frequency 1027 (i.e., in the range of frequencies indicated at 1030) results in a smaller (in absolute value) than 90° 1033 phase difference, i.e., a phase difference closer to 0°. On the other hand, a drive mode frequency greater than the sense mode resonant frequency 1027 (i.e., in the range of frequencies indicated at 1036) results in a larger than 90° (in absolute value) phase difference, i.e., closer to $-180°$. Thus, the phase of the sense mode is related to the frequency of the drive mode. Driving the drive mode at a frequency other than the sense mode resonant frequency 1027 causes less-than-peak amplitude oscillations of the sense mode, for example as indicated at 1021. It should be noted that the graphs 1000 and 1012 represent displacements, not velocities. Velocities are 90° out of phase with displacements.

We prefer to operate the drive mode at its resonant frequency $f_0$, because doing so causes maximum displacement in the drive mode and, therefore, maximizes energy transfer to the sense mode, if there is an angular rate about the axis 818. The resonant frequency $f_0$ of the drive mode is referred to herein as the "reference frequency," because several signals are derived from, or based on, this frequency.

As noted, in the prior art, steps are taken to make the drive and sense resonant frequencies identical, i.e., to operate in degenerate modes. In direct contrast to the teachings of the prior art, in embodiments of the present invention, devices are purposefully operated, or configured to operate, in non-degenerate modes. The two resonant frequencies differ by a small amount ($\Delta f$). In some embodiments, $\Delta f$ is in a range of about $f_0/24Q$ to about $6f_0/Q$, where $f_0$ is the resonant frequency of the drive mode, and Q is the Q of the bulk mode. In some embodiments, $\Delta f$ is in a range of about $f_0/12Q$ to about $3f_0/Q$.

In some embodiments, $\Delta f$ is about $f_0/2Q$, which corresponds to a sense mode displacement phase of about 45° (1024, FIG. 10) or 135°, if the drive frequency is above the sense frequency. As shown at 1039, the amplitude of the sense mode oscillation is about 3 dB less than it would be at sense mode resonance 1027, which yields 70% of the peak sense mode amplitude, which is useful in many contexts. As discussed below, a sense mode displacement phase of 45° or +45° is less complex to implement than many other phase angles. In some embodiments, such a $\Delta f$ provides good results, such as a good tradeoff between signal strength and bandwidth. Here we describe embodiments in which the drive frequency is less than the sense resonant frequency. However, it should be clear to one skilled in the art that the drive frequency could be more than the sense resonant frequency, in which case the sense would lag the drive by more than 90°.

In some embodiments, the operating frequency of the BAW gyroscope and the difference in resonant frequencies ($\Delta f$) may be selected such that the loss of sensitivity, as a result of using non-degenerate modes, is modest, while yielding a desired bandwidth. In some embodiments, $\Delta f$ is in a range of more than 0 Hz to about 10 KHz.

Inherent non-idealities in manufactured BAW devices may be exploited to achieve the non-degenerate modes. Optionally or alternatively, intentional non-idealities may be purposefully introduced in manufactured BAW devices, such as fabricating a BAW device such that the resonator is not fully symmetric. Optionally or alternatively, bias voltages may be applied to selected electrodes and/or the drive signals may be generated so as to induce the non-degenerate modes, as discussed below. For example, high DC voltages may be applied to one or more electrodes to alter the stiffness of the BAW disk 300 in the drive and/or sense modes, so as to increase or decrease the difference between the drive and sense mode resonant frequencies, as needed. If, as manufactured, the drive and sense mode resonant frequencies are too close together, apparatus and methods described herein may be used to separate the frequencies. On the other hand, if the natural modes have resonant frequencies that are too far apart, the apparatus and methods describe herein may be used to force the resonant frequencies closer together, but not to become identical.

One method to achieve the desired difference between the drive and sense resonant frequencies is to alter the stiffness of drive and/or sense modes of the BAW disk 300 by superimposing a DC voltage on the drive signal or on other electrodes. The same polarity DC voltage is imposed on both sides of the BAW disk 300. This DC voltage increases attraction between the BAW disk 300 and the electrodes, as the distance separating the BAW disk 300 and the electrodes decreases during each oscillation. The net effect is that of a "negative spring." As a mechanical spring is distorted, the spring produces an increased restorative force, according to Hooke's Law ($F=-kx$). However, in electrostatic systems, as the BAW disk 300 is distorted and its side becomes closer to a drive electrode, the system produces an increased distortive force (i.e., a reduced restorative force). Thus, if the BAW disk 300 is modeled as a spring-mass system, the spring is made weaker by the DC voltage. Effectively, the stiffness of the BAW disk 300 can be changed by application of the DC voltage. The change in stiffness may be applied to the BAW disk 300 as desired to alter the resonant frequency of the drive and/or sense mode.

Drive Circuit

Figure 11:
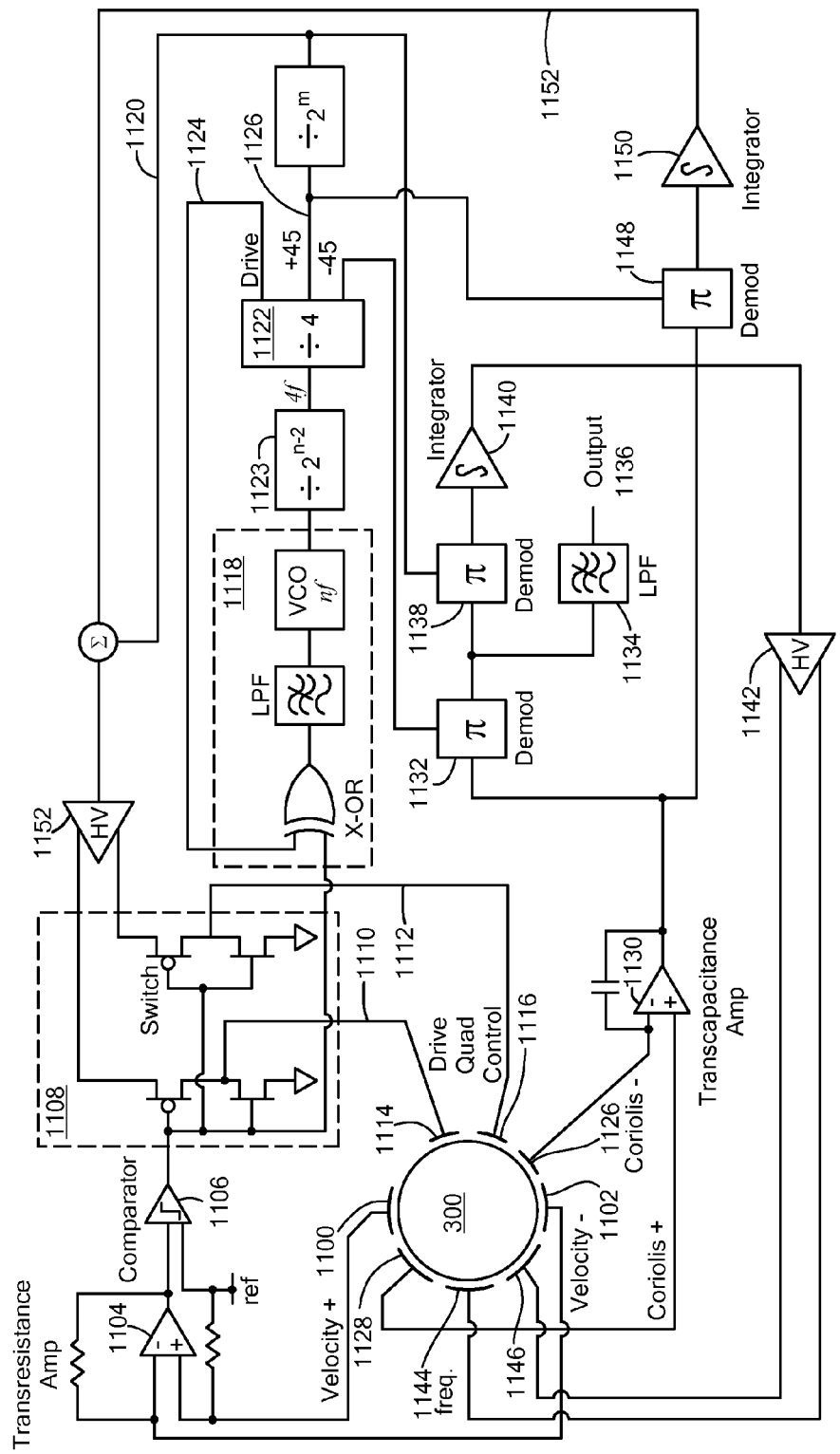
FIG. 11 is a schematic block diagram of a BAW gyroscope, including a BAW disk and drive and sense circuitry, according to an embodiment of the present invention.

FIG. 11 is a schematic block diagram of a BAW gyroscope that includes a BAW disk 300 that has appropriate elliptical drive and sense modes. FIG. 11 also shows drive and sense circuitry, according to an embodiment of the present invention. The circuit of FIG. 11 operates the BAW disk 300, such that the difference ($\Delta f$) between the drive and sense mode resonant frequencies corresponds a sense mode displacement phase of −45°. However, other embodiments may use another sense mode displacement phase, as described below.

An oscillator drives the BAW disk 300 in a drive mode. Drive pickoff electrodes 1100 and 1102 provide feedback signals to a transresistance amplifier 1104 and a comparator 1106, which drives a switching circuit 1108. Collectively, these components 1104-1108 generate complementary drive signals 1110 and 1112 that are used by drive electrodes 1114 and 1116 to stimulate the drive mode in the BAW disk 300. This arrangement maintains the drive at resonance.

Figure 12:
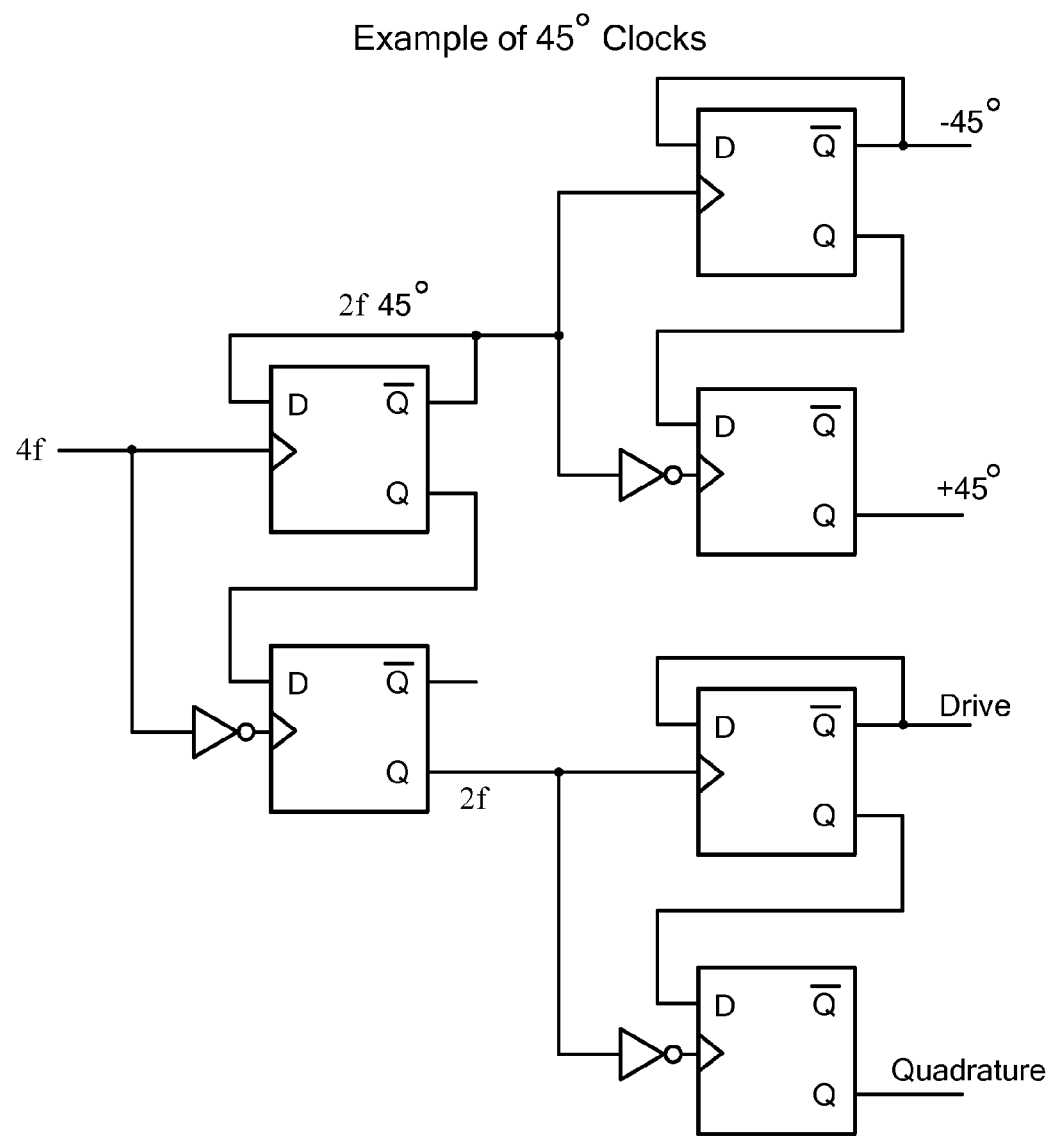
FIG. 12 is a schematic block diagram of a divider circuit of FIG. 11.
Figure 13:
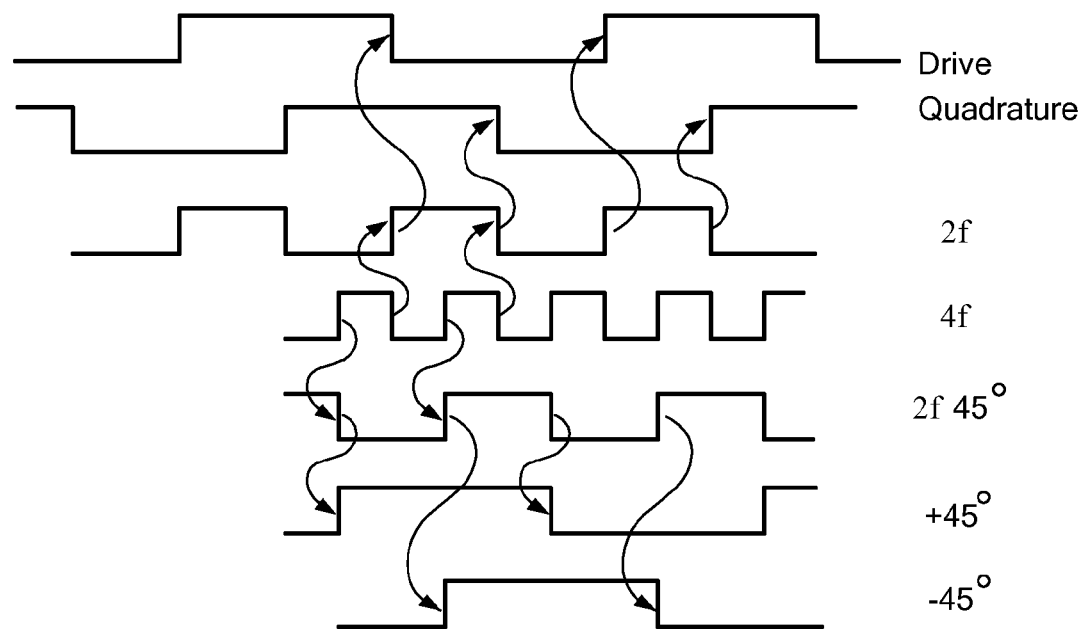
FIG. 13 illustrates waveforms of portions of the divider circuit of FIG. 12.

A phase-locked loop (PLL) 1118 is coupled to divider circuit 1122 that generates various signals, including a drive reference signal 1124 and two signals that are 90° apart in phase. FIG. 12 is a schematic block diagram of an implementation of the divider circuit 1122, and FIG. 13 illustrates waveforms of the signals in the divider circuit 1122. In this discussion, the difference ($\Delta f$) between the drive and sense mode resonant frequencies corresponds a sense mode displacement phase of −45°. However, other sense mode displacement phase angles, i.e., other differences ($\Delta f$) between the drive and sense mode resonant frequencies, may be used. The circuit shown in FIG. 12 and, if necessary, the divider 1123 (FIG. 11) may be modified to produce other binary sub-multiples of 90° sense mode displacement phases or non-binary sub-multiples of 90°, such as by decoding the outputs of the divider chain, as one of ordinary skill in the art would recognize.

Figure 15:
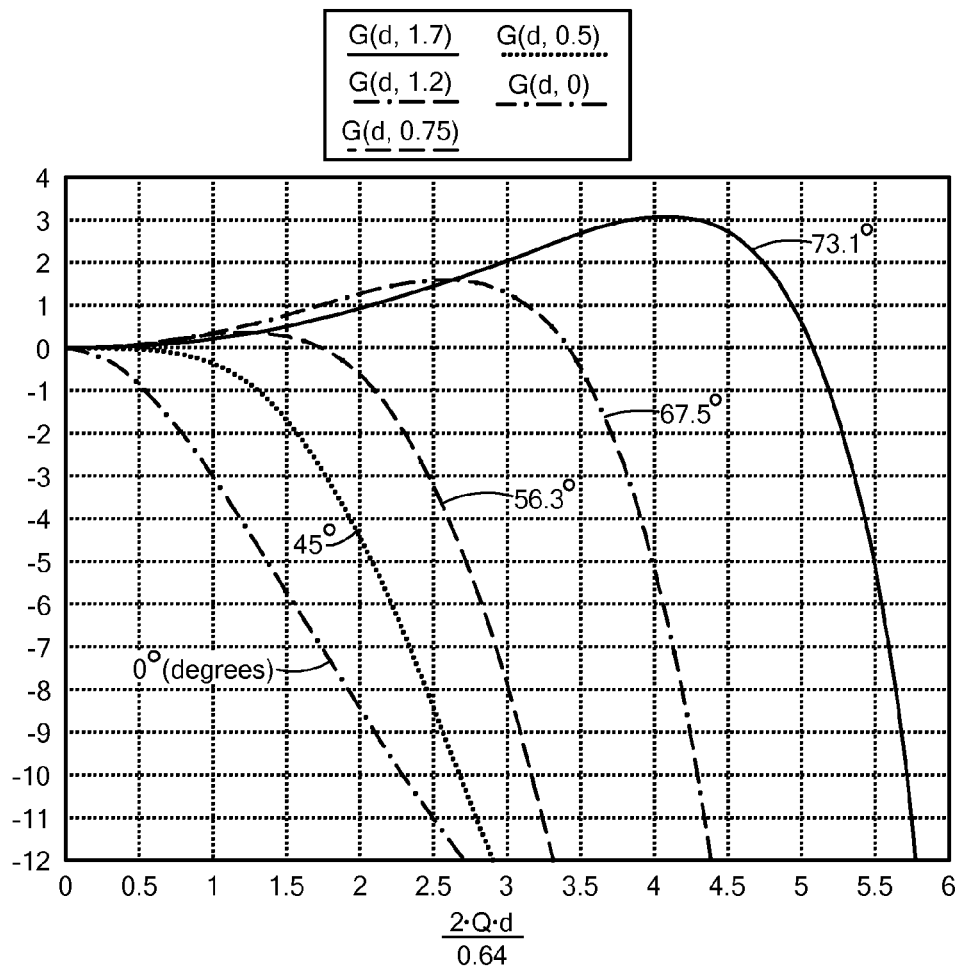
FIG. 15 contains a graph illustrating normalized gyroscope frequency responses for degenerate and non-degenerate operation using the examples of FIG. 14, according to an embodiment of the present invention.

FIG. 14 contains a table that lists examples of various frequency differences between drive and sense modes and corresponding results, compared to operating in degenerative mode (i.e., with a frequency difference of zero). FIG. 15 contains a graph illustrating normalized gyroscope frequency responses for degenerate and non-degenerate operation using the examples of FIG. 14.

Returning to FIG. 11, a sub-harmonic 1120 of a +45° signal 1126 is used to differentially modulate magnitude of the drive signal 1110 and 1112 to maintain the sense mode displacement phase of −45°, relative to the drive signal, i.e. to cause operation in non-degenerate modes. Although the divider circuit 1122 may be constructed to generate reference signals corresponding to other sense mode displacement phase angles, the two + and − phase reference signals should be 90° apart.

Coriolis pickoff electrodes 1126 and 1128 sense oscillations of the BAW disk 300 in the sense mode. A signal from a transcapacitance differential amplifier 1130 is demodulated by a demodulator 1132 (against a −45° signal from the divider 1122) and then low-pass filtered by a filter 1134 to produce a Coriolis (or rate) signal 1136.

Another servo employs the "negative spring" concept described above to control the difference between the drive and sense mode resonant frequencies by altering the stiffness of the drive and sense modes of the BAW disk 300. The output of the demodulator 1132 is further demodulated by a second demodulator 1138 (against the sub-harmonic signal 1120) to measure how far from the sense mode displacement phase is from the desired −45°. The resultant signal is integrated by integrator 1140 and then amplified by high-voltage amplifier 1142 to generate differential bias voltages that are applied to an electrode 1144 positioned proximate a drive mode anti-node and an electrode 1146 positioned proximate a sense mode anti-node. Differentially driving these bias electrodes 1144 and 1146 requires less bias signal level than a single-ended bias circuit that changes the stiffness of only the drive mode or only the sense mode. Furthermore, the BAW disk 300 can be fabricated with equal stiffnesses in both modes, rather than requiring the BAW disk 300 to be fabricated with a deliberate imperfection. Fabrication of symmetric devices is typically preferred, from design and process perspectives.

Although we prefer to apply the bias signals differentially across the drive and sense modes, in another embodiment, the bias signals may be added to electrodes positioned proximate only drive mode anti-nodes or to electrodes positioned proximate only sense mode anti-nodes that have no other signals applied to them. Alternatively, the bias signals may be coupled to any combination of drive and/or sense electrodes that have other signals on them. Alternatively, the bias signals may be coupled to the switching circuit 1108, so the bias signals appear superimposed on the drive signals on the drive electrodes 1114 and 1116. Appropriate coupling techniques, such as blocking capacitors, amplifiers, etc. should be used, as would be well known to those of ordinary skill in the art.

Yet another servo obtains a quadrature signal to differentially balance the magnitude of the drive signal to the BAW disk 300, between the two drive electrodes 1112 and 1114. The signal from the amplifier 1130 is demodulated by demodulator 1148 (against the +45° signal from the divider 1122) and integrated 1150. If the Coriolis pickoff electrodes 1126 and 1128 are not centered on their respective sense mode anti-nodes (which coincide with nodes of the drive mode), the electrodes 1126 and 1128 detect some of the drive mode motion of the BAW disk 300. The quadrature signal 1152 is summed with the PLL correction signal 1120 and amplified by a high-voltage amplifier 1152 to provide operating voltage for the switching circuit 1108 and, thereby, to the drive electrodes 1114 and 1116. The differential signal on the drive electrodes 1114 and 1116 is servoed to correctly dispose the drive mode, such that it has a nodes at the Coriolis sense electrodes 1126 and 1128.

We believe using phase-shifted references, such as the +45° signal 1126 and the −45° signal used to demodulate the Coriolis signal, rather than raw drive and quadrature signals is novel.

For simplicity, the embodiment shown in FIG. 11 has a small number of drive, sense, bias, etc. electrodes. As note with respect to FIG. 9, there may be one or more electrodes for each anti-node for each mode.

Noise

As noted, the mode B oscillations are slightly off (by Δf) the resonant frequency of mode B. Oscillating at reduced amplitude results in reduced signal level, thereby decreasing the signal to noise (S/N) ratio. However, it is usually possible to design amplifiers such that the primary noise source in BAW systems is thermomechanical, as opposed to thermo-electric. That is, most of the noise is generated by mechanical components, not by electronics. Much of the noise is caused by ambient air. Therefore, operating the BAW disk 300 in a vacuum would generate less noise, but such a configuration would be more difficult to fabricate. In a vacuum-based BAW system, most losses are caused by mechanical loss of energy due to constraints on movement of the BAW disk 300 imposed by the pedestal. However, when operating in non-degenerate modes, the ratio of mechanical noise to Coriolis signal is not degraded. Only the ratio of Coriolis signal to electronic noise is degraded. However, as noted, the mechanical noise is far greater than the electronic noise. Furthermore, the electronic noise can be reduced by appropriate choices in amplifier design, etc., at the cost of increased power consumption.

Also as noted, operating the sense mode off its resonant frequency yields greater bandwidth, which is advantageous in and of itself. However, it is possible to narrow the bandwidth and increase the Q of the sense mode by evacuating or increasing the vacuum surrounding the BAW disk, thereby increasing gain. Increasing the Q of the sense mode also increases the Q of the drive mode. Therefore, more drive mode energy is available for transfer into the sense mode, increasing the Coriolis signal level, thereby improving the Coriolis SNR. In contrast, if a prior art degenerate mode BAW device were fabricated with increased Q, such as by increasing the vacuum, bandwidth would be lost, due to the narrowing of the sense mode response curve.

Split Electrodes

Ideally, a single drive electrode is centered about each drive mode anti-node that is to be driven, and a single sense electrode is centered about each sense mode anti-node that is to be sensed. (See FIG. 9.) Furthermore, ideally the BAW disk oscillates perfectly symmetrically. However, manufacturing non-idealities can cause asymmetries in the BAW disk, drive electrode size and placement, sense electrode size and placement, etc. Thus, as a practical matter, no electrode is ideally sized and placed, relative to its corresponding anti-node, and the BAW disk may oscillate asymmetrically. Any such error leads to asymmetric force being applied by a drive electrode, or unwanted pick up of drive mode movement by a sense mode pickup electrode.

To compensate for such errors in the drive electrodes or in the BAW disk 300 proximate the drive electrodes, the circuit of FIG. 11 includes split electrodes 1114 and 1116. The two split electrodes 1114 and 1116 are both placed adjacent a single drive mode anti-node. However, the split electrodes 1114 and 1116 are placed symmetrically about the anti-node, and a possibly different proportion of the drive signal is provided to each of the split electrodes 1114 and 1116. Therefore, one of the two split electrodes 1114 and 1116 can be made to exert a greater force on the BAW disk 300 than the other of the split electrodes. Essentially, the effective location of the sum of the two split electrodes 1114 and 1116 is shifted to match the drive mode anti-node. The servo that includes the demodulator 1148 automatically determines the quadrature error (essentially how far off center the pair of electrodes 1114 and 1116 is, relative to the location of the drive mode anti-node) and adjusts the proportion of drive signal provided to each of the split electrodes 1114 and 1116 to shift the effective center the pair of split electrodes 1114 and 1116, as needed, to make the effective center register with the drive mode anti-node and, therefore, apply a symmetric force on the anti-node.

Figure 16:
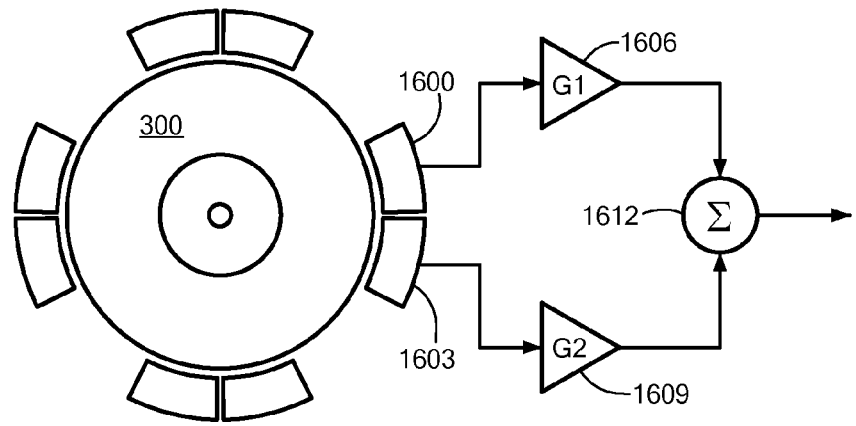
FIG. 16 is a schematic block diagram of a split electrode, according to an embodiment of the present invention.

Optionally or alternatively, each Coriolis sense electrode may be split and separately amplified, as shown schematically in FIG. 16. A pair of split sense electrodes 1600 and 1603 is positioned proximate a single sense mode anti-node.

Each split sense electrode 1600 and 1603 is coupled to a respective adjustable-gain amplifier 1606 and 1609, and the outputs of the amplifiers 1606-1609 is added by a summer 1612 to generate a Coriolis signal. A servo (not shown) automatically detects asymmetry in the placements of the electrodes 1600 and 1603 and the BAW disk 300 and adjusts the gains of the amplifiers 1606-1609 to preferentially amplify the signal from the disadvantaged electrode 1600 or 1603. The gains may be adjusted until the signal amplitudes from the outputs of the two amplifiers 1606 and 1609 are the same.

Optionally or alternatively, a servo may automatically adjust the gains of the amplifiers 1606 and 1609, so the sum of the outputs of the two amplifiers 1606 and 1609 equals zero when there is no Coriolis signal. That is, the relative gains of the two amplifiers may be adjusted, such that the quadrature signal is nulled (or at least minimized). In one embodiment, another electrode, such as a self-test electrode, is used to induce a Coriolis signal or equivalent thereto, and then the relative gains of the two amplifiers 1606 and 1609 are adjusted, so as to maximize the sum of the amplifier outputs.

Similarly, split electrodes may be used to be electronically center the velocity pickoff electrodes (1100 and 1102, FIG. 11) on the drive mode anti-node that is used to generate the drive feedback signal.

Other Modes

Although the discussion above, with respect to FIGS. 3-16, relate to in-plane bulk oscillatory motions, other oscillatory motions are also possible. For example, out-of-plane "swelling" of the BAW disk 300 (which is a bulk mode) or out-of-plane "bending" (flexure) of the top surface of the BAW disk 300 (which is also a bulk mode) may be utilized. Some or all of these motions may be used to sense angular rates about various axis of the BAW disk 300. Additional or different electrodes than those shown in FIG. 9 may be required, depending on the direction and type of oscillatory motions anticipated. However, the principles describe herein may be applicable to these out-of-plane modes.

Although gyroscopes that sense rotation about the z axis have been described, gyroscopes that sense rotation about any axis or combination of axis may employ the principles described herein.

Packaging

Although BAW disks have been described, BAW gyroscopes operating according to the principles described herein may be fabricated in other suitable shapes, such as rectangles, rings or wheels. All such shapes are referred to herein as "disks" for simplicity. A BAW disk and its associate electrodes, optionally with associated drive and/or sense circuitry, may be fabricated on a single substrate or a plurality of substrates. One or more such BAW disks (optionally along with its associated circuitry) may be packaged in any suitable semiconductor package, such as a pre-molded leadframe package, a substrate package or a ceramic package. The package may be hermetically sealed or non-hermetically sealed, depending on application criteria. Such packages may include electrical lead, pads or other connection points, as are well known in the art.

General

The Q of a BAW disk mode may be determined by toggling the phases of the drive signal by 45°. Measuring the amplitude of the drive signal, 45° in either direction, and noting the frequency shift, gives Q directly.

A MEMS device may operate a resonator in a non-degenerate mode according to any of the embodiments disclosed herein.

A MEMS device may include split drive electrodes and related circuitry for driving movement of a movable mass according to any of the embodiments disclosed herein.

MEMS device may include split sense electrodes and related circuitry for sensing movement of a movable mass according to any of the embodiments disclosed herein.

An electrical circuit may be configured to produce non-degenerate modes for a resonator in a MEMS device according to any of the embodiments disclosed herein.

An electrical circuit may be configured to operate split drive electrodes for a movable mass in a MEMS device according to any of the embodiments disclosed herein.

An electrical circuit may be configured to operate split sense electrodes for a movable mass in a MEMS device according to any of the embodiments disclosed herein.

A method for producing non-degenerate modes for a resonator in a MEMS device may be performed according to any of the embodiments disclosed herein.

A method for operating split drive electrodes for a movable mass in a MEMS device may be performed according to any of the embodiments disclosed herein.

A method for operating split sense electrodes for a movable mass in a MEMS device may be performed according to any of the embodiments disclosed herein.

The resonator or movable mass may be operated in a bulk mode.

The resonator or movable mass may be operated in a flexure mode.

The MEMS device may be a gyroscope.

While the invention is described through the above-described exemplary embodiments, it will be understood by those of ordinary skill in the art that modifications to, and variations of, the illustrated embodiments may be made without departing from the inventive concepts disclosed herein. While specific values chosen for these embodiments are recited, it is to be understood that, within the scope of the invention, the values of all of parameters may vary over wide ranges to suit different applications. Furthermore, disclosed aspects, or portions of these aspects, may be combined in ways not listed above. Accordingly, the invention should not be viewed as being limited to the disclosed embodiments.

What is claimed is:

1. A microelectromechanical systems (MEMS) gyroscope, comprising:
    a substrate;
    a primary member attached to the substrate and configured to vibrate in a first bulk acoustic mode at a drive frequency in response to a varying electrostatic signal and to vibrate in a second bulk acoustic mode at the drive frequency in response to the primary member being rotated about an axis, wherein the first bulk acoustic mode and the second bulk acoustic mode are non-degenerate;
    a circuit coupled to the primary member and configured to maintain a difference between the first bulk acoustic mode and the second bulk acoustic mode.

2. A microelectromechanical systems (MEMS) gyroscope according to claim 1, wherein:
    the circuit comprises:
        a drive circuit configured to generate the varying electrostatic signal; and
        a servo circuit coupled to the drive circuit;

the second bulk acoustic mode is characterized by a resonant frequency different than the drive frequency; and the servo is configured to sense phase response of the second bulk acoustic mode and to automatically adjust, based on the sensed phase response, operation of the drive circuit, so as to maintain the difference between the resonant frequency and the drive frequency.

3. A microelectromechanical systems (MEMS) gyroscope according to claim 1, wherein the second bulk acoustic mode is characterized by a resonant frequency, and the drive frequency differs from the resonant frequency of the second bulk acoustic mode by $\Delta f$, where $\Delta f$ is between about $f_0/24Q$ and about $6f_0/Q$, and where $f_0$ is the drive frequency.

4. A microelectromechanical systems (MEMS) gyroscope according to claim 1, wherein the second bulk acoustic mode is characterized by a resonant frequency, and the drive frequency differs from the resonant frequency of the second bulk acoustic mode by $\Delta f$, where $\Delta f$ is between about $f_0/12Q$ and about $3f_0/Q$, and where $f_0$ is the drive frequency.

5. A microelectromechanical systems (MEMS) gyroscope according to claim 1, wherein the second bulk acoustic mode is characterized by a resonant frequency, and the drive frequency differs from the resonant frequency of the second bulk acoustic mode by $\Delta f$, where $\Delta f$ is about $f_0/2Q$, and where $f_0$ is the drive frequency.

6. A microelectromechanical systems (MEMS) gyroscope according to claim 1, wherein the second bulk acoustic mode is characterized by a resonant frequency, and the drive frequency differs from the resonant frequency of the second bulk acoustic mode by $\Delta f$, where $\Delta f$ is greater than 0 Hz and up to about 10 KHz.

7. A microelectromechanical systems (MEMS) gyroscope according to claim 1, wherein the second bulk acoustic mode is characterized by a resonant frequency, and the drive frequency differs from the resonant frequency of the second bulk acoustic mode by $\Delta f$, where $\Delta f$ corresponds to a second bulk acoustic mode displacement phase angle of between about $-5°$ and about $-85°$.

8. A microelectromechanical systems (MEMS) gyroscope according to claim 1, wherein the second bulk acoustic mode is characterized by a resonant frequency, and the drive frequency differs from the resonant frequency of the second bulk acoustic mode by $\Delta f$, where $\Delta f$ corresponds to a second bulk acoustic mode displacement phase angle of between about $-20°$ and about $-60°$.

9. A microelectromechanical systems (MEMS) gyroscope according to claim 1, wherein the second bulk acoustic mode is characterized by a resonant frequency, and the drive frequency differs from the resonant frequency of the second bulk acoustic mode by $\Delta f$, where $\Delta f$ corresponds to a second bulk acoustic mode displacement phase angle of about $-45°$.

10. A microelectromechanical systems (MEMS) gyroscope according to claim 1, wherein:

the circuit comprises a drive circuit configured to generate the varying electrostatic signal; the microelectromechanical systems (MEMS) gyroscope further comprising:

at least one split drive electrode having a surface counterfacing a side of the primary member and coupled to the drive circuit to receive the varying electrostatic signal, wherein each of the at least one split electrode comprises a first sub-electrode and a second-sub-electrode, the counterfacing surface being approximately equally divided between the first and second sub-electrodes, the first sub-electrode spaced apart from the second sub-electrode by distance less than about 0.1 times a width of the surface of the split electrode.

11. A microelectromechanical systems (MEMS) gyroscope according to claim 1, further comprising:

a split electrode disposed proximate a desired location of an anti-node of the first bulk acoustic mode, the split electrode comprising at least two electrodes disposed symmetrically about the desired location of the anti-node;

a first gain-adjustable amplifier, an input of which is coupled to one of the two electrodes, a second gain-adjustable amplifier, an input of which is couple to the other of the two electrodes, and a summer coupled to outputs of the first and second gain-adjustable amplifiers; and a servo circuit configured to automatically adjust gains of the first and second gain-adjustable amplifiers, based on at least one phase-shifted reference signal, so as to reduce a quadrature error.

12. A microelectromechanical systems (MEMS) gyroscope according to claim 1, further comprising:

a split electrode disposed proximate a desired location of an anti-node of the first bulk acoustic mode, the split electrode comprising at least two electrodes disposed symmetrically about the desired location of the anti-node;

a first gain-adjustable amplifier, an input of which is coupled to one of the two electrodes, a second gain-adjustable amplifier, an input of which is couple to the other of the two electrodes, and a summer coupled to outputs of the first and second gain-adjustable amplifiers; and a servo circuit configured to automatically adjust gains of the first and second gain-adjustable amplifiers, based on at least one phase-shifted reference signal, so as to maximize output of the summer, in response to application of a signal to the bulk acoustic resonator.

13. A microelectromechanical systems (MEMS) gyroscope according to claim 1, further comprising:

a split electrode disposed proximate a desired location of an anti-node of the first bulk acoustic mode, the split electrode comprising at least two electrodes disposed symmetrically about the desired location of the anti-node; wherein the circuit comprises:

a drive circuit configured to generate the varying electrostatic signal, coupled to the at least two electrodes and configured to differentially drive the at least two electrodes; and a servo circuit coupled to the drive circuit and configured to automatically adjust how the drive circuit differentially drives the at least two electrodes, based on at least one phase-shifted reference so as to reduce a quadrature error.

14. A microelectromechanical systems (MEMS) gyroscope according to claim 1, wherein the circuit comprises:

a drive circuit configured to generate the varying electrostatic signal; and a servo circuit coupled to the drive circuit and configured to maintain the difference between the first bulk acoustic mode and the second bulk acoustic mode.

15. A microelectromechanical systems (MEMS) gyroscope, comprising:

a bulk acoustic resonator;

at least one first electrode coupled to the bulk acoustic resonator, the at least one first electrode being positioned to excite vibration of the bulk acoustic resonator in a first bulk acoustic wave mode;

at least one second electrode coupled to the bulk acoustic resonator, the at least one second electrode being positioned to detect vibration of the bulk acoustic resonator in a second bulk acoustic mode, the first and second bulk acoustic wave modes being non-degenerate;

a drive circuit configured to deliver a drive signal to the at least one first electrode; and a servo circuit coupled to the drive circuit and configured to adjust operation of the drive circuit to maintain a difference between the first bulk acoustic wave mode and the second bulk acoustic mode.

16. A method for sensing angular rotation, the method comprising:

applying a varying electrostatic signal to a primary member to cause the primary member to vibrate in a first bulk acoustic mode at a drive frequency;

rotating the primary member;

sensing a second bulk acoustic mode vibration of the primary member at the drive frequency, the first bulk acoustic mode and the second bulk acoustic mode being non-degenerate; and maintaining a difference between the first bulk acoustic mode and the second bulk acoustic mode.

17. A method according to claim 16, wherein:

the second bulk acoustic mode is characterized by a resonant frequency different than the drive frequency; the method further comprising:

sensing phase response of the second bulk acoustic mode; and based on the sensed phase response, automatically maintaining the difference between the resonant frequency and the drive frequency.

18. A method according to claim 16, wherein the second bulk acoustic mode is characterized by a resonant frequency, and the drive frequency differs from the resonant frequency of the second bulk acoustic mode by $\Delta f$, where $\Delta f$ is between about $f_0/24Q$ and about $6f_0/Q$, and where $f_0$ is the drive frequency.

19. A method according to claim 16, wherein the second bulk acoustic mode is characterized by a resonant frequency, and the drive frequency differs from the resonant frequency of the second bulk acoustic mode by $\Delta f$, where $\Delta f$ is between about $f_0/12Q$ and about $3f_0/Q$, and where $f_0$ is the drive frequency.

20. A method according to claim 16, wherein the second bulk acoustic mode is characterized by a resonant frequency, and the drive frequency differs from the resonant frequency of the second bulk acoustic mode by $\Delta f$, where $\Delta f$ is about $f_0/2Q$, and where $f_0$ is the drive frequency.

21. A method according to claim 16, wherein the second bulk acoustic mode is characterized by a resonant frequency, and the drive frequency differs from the resonant frequency of the second bulk acoustic mode by $\Delta f$, where $\Delta f$ is greater than 0 Hz and up to about 10 KHz.

22. A method according to claim 16, wherein the second bulk acoustic mode is characterized by a resonant frequency, and the drive frequency differs from the resonant frequency of the second bulk acoustic mode by $\Delta f$, where $\Delta f$ corresponds to a second bulk acoustic mode displacement phase angle of between about −5° and about −85°.

23. A method according to claim 16, wherein the second bulk acoustic mode is characterized by a resonant frequency, and the drive frequency differs from the resonant frequency of the second bulk acoustic mode by $\Delta f$, where $\Delta f$ corresponds to a second bulk acoustic mode displacement phase angle of between about −20° and about −60°.

24. A method according to claim 16, wherein the second bulk acoustic mode is characterized by a resonant frequency, and the drive frequency differs from the resonant frequency of the second bulk acoustic mode by $\Delta f$, where $\Delta f$ corresponds to a second bulk acoustic mode displacement phase angle of about −45°.

* * * * *

UNITED STATES PATENT AND TRADEMARK OFFICE
CERTIFICATE OF CORRECTION

| | | |
|---|---|---|
| PATENT NO. | : 8,794,068 B2 | Page 1 of 1 |
| APPLICATION NO. | : 13/309511 | |
| DATED | : August 5, 2014 | |
| INVENTOR(S) | : Judy et al. | |

It is certified that error appears in the above-identified patent and that said Letters Patent is hereby corrected as shown below:

In The Claims

In Col. 15, line 3
insert --circut-- after "servo"

In Col. 16, line 50
insert --signal-- after "reference"

Signed and Sealed this
Twenty-seventh Day of January, 2015

Michelle K. Lee
*Deputy Director of the United States Patent and Trademark Office*

UNITED STATES PATENT AND TRADEMARK OFFICE
CERTIFICATE OF CORRECTION

PATENT NO.           : 8,794,068 B2  
APPLICATION NO.      : 13/309511  
DATED                : August 5, 2014  
INVENTOR(S)          : Judy et al.

It is certified that error appears in the above-identified patent and that said Letters Patent is hereby corrected as shown below:

In the Claims

In Col. 15, line 3  
insert --circuit-- after "servo"

In Col. 16, line 50  
insert --signal-- after "reference"

This certificate supersedes the Certificate of Correction issued January 27, 2015.

Signed and Sealed this  
Twenty-sixth Day of May, 2015

Michelle K. Lee  
*Director of the United States Patent and Trademark Office*